US010704188B2

(12) United States Patent
Zhao et al.

(10) Patent No.: US 10,704,188 B2
(45) Date of Patent: *Jul. 7, 2020

(54) AUTOMATIC LEVELING WASHING MACHINE

(71) Applicants: QINGDAO HAIER WASHING MACHINE CO., LTD., Shandong (CN); QINGDAO HAIER SMART TECHNOLOGY R&D CO., LTD., Shandong (CN)

(72) Inventors: Zhiqiang Zhao, Shandong (CN); Sheng Xu, Shandong (CN)

(73) Assignees: QINGDAO HAIER WASHING MACHINE CO., LTD., Qingdao, Shandong (CN); QINGDAO HAIER SMART TECHNOLOGY R&D CO., LTD., Qingdao, Shandong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/753,021

(22) PCT Filed: Jun. 29, 2017

(86) PCT No.: PCT/CN2017/090831
§ 371 (c)(1),
(2) Date: Feb. 15, 2018

(87) PCT Pub. No.: WO2018/001317
PCT Pub. Date: Jan. 4, 2018

(65) Prior Publication Data
US 2018/0237978 A1 Aug. 23, 2018

(30) Foreign Application Priority Data

Jun. 30, 2016 (CN) .......................... 2016 1 0510928

(51) Int. Cl.
*D06F 39/12* (2006.01)
*F16M 7/00* (2006.01)
*D06F 37/22* (2006.01)

(52) U.S. Cl.
CPC ............. *D06F 39/125* (2013.01); *F16M 7/00* (2013.01); *D06F 37/22* (2013.01); *D06F 39/12* (2013.01); *D06F 2222/00* (2013.01)

(58) Field of Classification Search
CPC ........ D06F 39/125; D06F 37/22; D06F 39/12; D06F 2222/00; F16M 7/00
See application file for complete search history.

(56) References Cited

U.S. PATENT DOCUMENTS 2,635,838 A * 4/1953 Branson ................ F16F 15/023
188/298
3,768,766 A * 10/1973 Bain ...................... A47B 91/16
248/188.2

(Continued)

FOREIGN PATENT DOCUMENTS

CH 695348 A5 4/2006
CN 101023239 A 8/2007

(Continued)

OTHER PUBLICATIONS

International Search Report (PCT/ISA/210) dated Sep. 21, 2017, by the State Intellectual Property Office of the P.R. China as the International Searching Authority for International Application No. PCT/CN2016/090831.

(Continued)

*Primary Examiner* — Kimberly T Wood
(74) *Attorney, Agent, or Firm* — Buchanan Ingersoll & Rooney PC

(57) ABSTRACT

An automatic leveling washing machine includes a shell and a barrel assembly. A bottom plate of the shell has leveling bottom feet with hydraulic medium therein and hydraulic (Continued)

medium flows between leveling bottom feet to execute automatic leveling washing machine. The bottom plate of the shell has mounting grooves for fixing and mounting leveling bottom feet. Hydraulic medium and some gas flows inside each leveling bottom foot or between leveling bottom feet. The amount of compression of the leveling bottom foot which is under bigger pressure is big, and the amount of compression of the leveling bottom foot which is under smaller pressure can still stretch, thereby automatically realizing the leveling of the height. The mounting groove effectively and quickly positions the leveling bottom feet. A circumferential surface of the mounting groove protects the leveling bottom feet and allows high reliability of operation.

10 Claims, 12 Drawing Sheets

(56) References Cited

U.S. PATENT DOCUMENTS

| | | | | |
|---|---|---|---|---|
| 3,954,241 | A * | 5/1976 | Carlson | A47B 91/16 248/188.3 |
| 4,967,994 | A * | 11/1990 | Rice | D06F 39/001 248/649 |
| 7,431,248 | B2 * | 10/2008 | Coumoyer | A47B 91/02 248/188.2 |
| 10,221,517 | B2 * | 3/2019 | Zhao | D06F 39/12 |
| 10,227,723 | B2 * | 3/2019 | Zhao | A47B 91/16 |
| 2008/0190696 | A1 | 8/2008 | Pike et al. | |
| 2010/0224742 | A1 | 9/2010 | Sorohan | |
| 2012/0193503 | A1 * | 8/2012 | Pike | A47B 91/16 248/560 |

FOREIGN PATENT DOCUMENTS

| | | |
|---|---|---|
| CN | 105755750 A | 7/2016 |
| CN | 105755757 A | 7/2016 |
| CN | 105757408 A | 7/2016 |
| DE | 10156397 A1 | 5/2003 |
| KR | 0128364 B1 | 4/1998 |
| KR | 20040003391 A | 1/2004 |

OTHER PUBLICATIONS

Written Opinion (PCT/ISA/237) dated Sep. 21, 2017, by the State Intellectual Property Office of the P.R. China as the International Searching Authority for International Application No. PCT/CN2016/090831.

* cited by examiner

AUTOMATIC LEVELING WASHING MACHINE

TECHNICAL FIELD

The present disclosure relates to a field of laundry equipment, and particularly relates to an automatic leveling washing machine.

BACKGROUND

A household appliance is generally provided with a leveling device at the bottom of its casing. During placement of the household appliance, the leveling device is adjusted to make the household appliance stably placed, and after the household appliance is leveled, the leveling device is used to support the household appliance to keep the household appliance stable.

Taking a washing machine for example, as shown in FIG. 1, the existing washing machine is usually provided with supporting feet 19 mounted at the bottom of its casing 9 or the whole machine. Each supporting foot 19 comprises a screw rod, a nut washer and a rubber pad, the nut washer can be screwed up and down around the screw rod, and the screw rod can also be screwed up and down in a screw hole in a base plate of the casing. Therefore, the height of the washing machine can be adjusted by screwing the screw rods of the supporting feet 19 into different lengths of the screw holes of the base plate. Mostly, the height of the washing machine is increased if the feet of the washing machine rotate counterclockwise, and the height of the washing machine is reduced if the feet of the washing machine rotate clockwise. After the height adjustment of the supporting feet is completed, the nut washers for preventing loosening are tightened to keep the washing machine stable.

Although said supporting feet of the washing machine implement the leveling of the washing machine, a user still needs to carry out manual adjustment, and if the washing machine has a relatively large self-weight or a placement space for the washing machine is narrow, user operations will be very inconvenient. Additionally, vibration of the washing machine in a long-term working process also influences the leveling feet and causes support failure of the feet, resulting in unlevel placement of the washing machine.

For example, an existing 80 KG drum washing machine generally has a weight of about 80 KG which is relatively heavy, so its height adjustment is very inconvenient for users, and even though the height adjustment is completed, it cannot be ensured that the washing machine is adjusted to an optimal state. When the washing machine works, especially accelerates in a speed range from 0 r/min to about 1400 r/min for drying, large vibration will occur if the washing machine is placed unlevel or has a problem of failing to support, which greatly influences use comfortableness of the user.

In addition, the vibration of the unlevel washing machine may cause loosening of foot screws which result in vertical movement of a foot bracket, and such unstability may change the leveling state of the washing machine and cause stronger vibration. Due to such vicious circle, after the washing machine is used for a long term, the noise is larger and larger, the washing machine per se is also damaged to a certain extent, and the service life of the washing machine is shortened.

Therefore, the leveling of the existing washing machine has problems that manual adjustment is needed, time and labor are wasted, and precision is relatively low.

In view of the foregoing, the present disclosure is proposed.

SUMMARY

To solve the problems mentioned above, an automatic leveling washing machine is provided. Specifically, the following technical solutions are adopted.

An automatic leveling washing machine comprises a shell and a barrel assembly set in the shell for washing clothes. A bottom plate of the shell is provided with leveling bottom feet. Hydraulic medium is provided inside the leveling bottom foot, and hydraulic medium flows inside the leveling bottom foot and/or between leveling bottom feet for automatically leveling the washing machine. The bottom plate of the shell is provided with mounting grooves for fixing and mounting leveling bottom feet.

Further, the leveling bottom foot comprises a fixed part and a movable part, and a hollow cavity is formed between the fixed part and the movable part. The hollow cavity is provided with a hydraulic medium. Under the action of pressure, the hydraulic medium flows in the hollow cavity inside the leveling bottom foot and/or the hollow cavity between leveling bottom feet for allowing the movable part to expand and contract, to execute automatic leveling. The mounting groove comprises a stamping groove which is stamped on the bottom plate. The stamping groove matches with the fixed part of the leveling bottom foot, and the fixed part of the leveling bottom foot is fixed in the stamping groove.

Further, the fixed part comprises a foot base, and the movable part comprises a flexible housing and an adjustable foot. The adjustable foot is slidably sleeved in the foot base, and a mounting chamber is formed by the adjustable foot and the foot base. The flexible housing is set in the mounting chamber. A hollow cavity is provided inside the flexible housing and is provided with hydraulic medium therein. One end of the foot base is fixed in the stamping groove, and at least part of a circumferential surface of the foot base is in close contact with the inner wall of the stamping groove.

Further, the foot base is respectively provided with an orifice and a valve opening which are communicated with the hollow cavity. The orifice and the valve opening are respectively connected with a high-pressure oil pipe group, and the high-pressure oil pipe group is communicated with the hollow cavity, thereby hydraulic medium flows between the leveling bottom feet. The mounting groove further comprises an oil pipe groove which is stamped on the bottom plate for accommodating the high-pressure oil pipe group.

Further, the bottom plate is a quadrangular plate, and leveling bottom feet are respectively mounted on four corners of the bottom plate. The stamping grooves are set on four corners of the bottom plate corresponding to the leveling bottom feet.

The leveling bottom feet at two ends of one edge of the bottom plate are respectively communicated with that of an opposite edge by the high-pressure oil pipe group. The oil pipe grooves are provided on two opposite edges of the bottom plate corresponding to high-pressure oil pipe group.

Further, two stamping grooves for fixing two leveling bottom feet, which are communicated with each other, are in communication with the oil pipe grooves for accommodating the high-pressure oil pipe group, which connects the two leveling bottom feet.

Further, a fixing assembly for fixing the high-pressure oil pipe group is provided in the oil pipe groove.

Further, the fixing assembly includes fixing holes disposed on two sides of the oil pipe groove and a tie whose two ends are respectively fixed in fixing holes on the two sides.

Further, the bottom plate is a quadrangular plate, and leveling bottom feet are respectively mounted on four corners of the bottom plate. The stamping grooves are set on four corners of the bottom plate corresponding to the leveling bottom feet.

Four leveling bottom feet are respectively connected to a same communicating device through the high-pressure oil pipe group to enable the hydraulic medium to flow between the four leveling bottom feet.

The stamping grooves on the four corners of the bottom plate respectively have chips for allowing the high-pressure oil pipe group to pass through.

Further, the foot base comprises a seat and a jacket. The adjustable foot is slidably sleeved at one end of the jacket, and the seat is set at the other end of the jacket and encloses the jacket.

The seat is provided with a number of fixing columns, and the fixing column is provided with mounting holes.

The stamping groove includes a fixing column groove which matches with the fixing column and a jacket groove which matches with the jacket. A second mounting hole corresponding to the mounting hole is provided in the fixing column groove.

The automatic leveling washing machine in the present disclosure, hydraulic medium and some gas flow inside each leveling bottom foot or between leveling bottom feet. And then the amount of compression of the leveling bottom foot under bigger pressure is big, and the leveling bottom foot under smaller pressure can still stretch, thereby automatically realizing the leveling of the height.

For the automatic leveling washing machine in the present disclosure, hydraulic pressure system can also self-level on the partial load during a washing process and a dewatering process of a washing machine, thereby realizing lower vibration and less noise.

For the automatic leveling washing machine in the present disclosure, the mounting groove effectively and quickly positions the leveling bottom feet. A circumferential surface of the mounting groove protects the leveling bottom feet and allows high reliability of operation even that a jacket of the leveling bottom foot is made of plastic.

Reference signs: 1—seat; 101—mounting hole; 2—oil nipple; 201—anti-stripping boss; 202—guide mechanism; 203—first oil nipple; 204—second oil nipple; 205—third oil nipple; 3—jacket; 301—vertical limiting groove; 4—adjustable foot; 401—vertical limiting bulge; 5—elastic pad; 6—flexible housing; 601—bellows section; 602—fine diameter structure; 603—sealing structure; 604—opening; 7—orifice; 8—valve opening; 9—shell; 901—bottom plate; 902—upper plate; 903—front plate; 904—side plate; 10—bottom foot; 11—press ring; 12—clamps; 13—high-pressure oil pipe group; 1301—first high-pressure oil pipe; 1302—second high-pressure oil pipe; 1303—third high-pressure oil pipe; 14—control panel; 15—communicating device; 16—ground; 1601—ground pit; 17—door; 18—cover plate; 19—supporting foot; 20—detergent box; 21—stamping groove; 2101—fixing column groove;

2102—second mounting hole; 2103—jacket groove; 2104—chip; 23—fixing hole; 24—tie; 25—oil pipe groove.

DETAILED DESCRIPTION

The following is further and specific description of an automatic leveling washing machine of the present disclosure with drawings.

The present disclosure provides a pulsator or drum washing machine with automatic leveling function, with advantages of being easy to use, simple structure, low cost and high reliability. Leveling bottom feet of the washing machine can significantly reduce vibration and noise, and improve the comfort of the user's experience of the washing machine.

Figure 1:
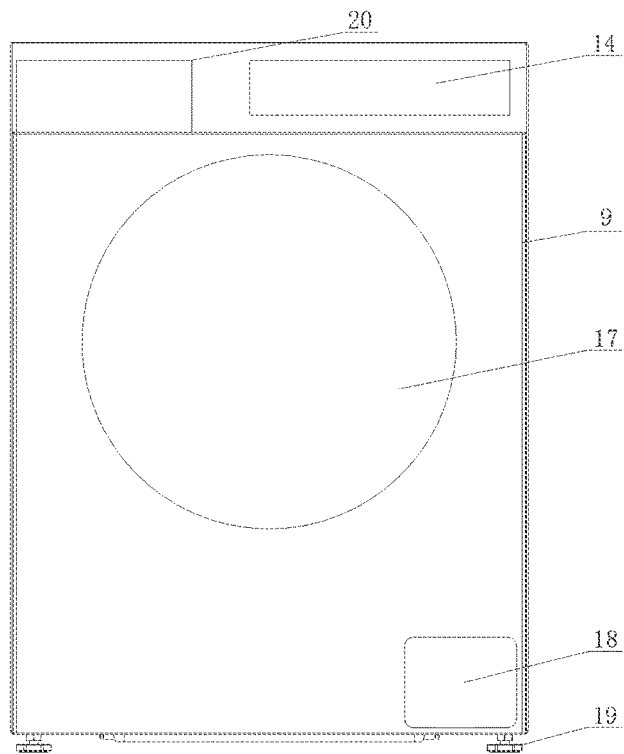
FIG. 1 is an installation schematic diagram of supporting feet of an existing washing machine.
Figure 2:
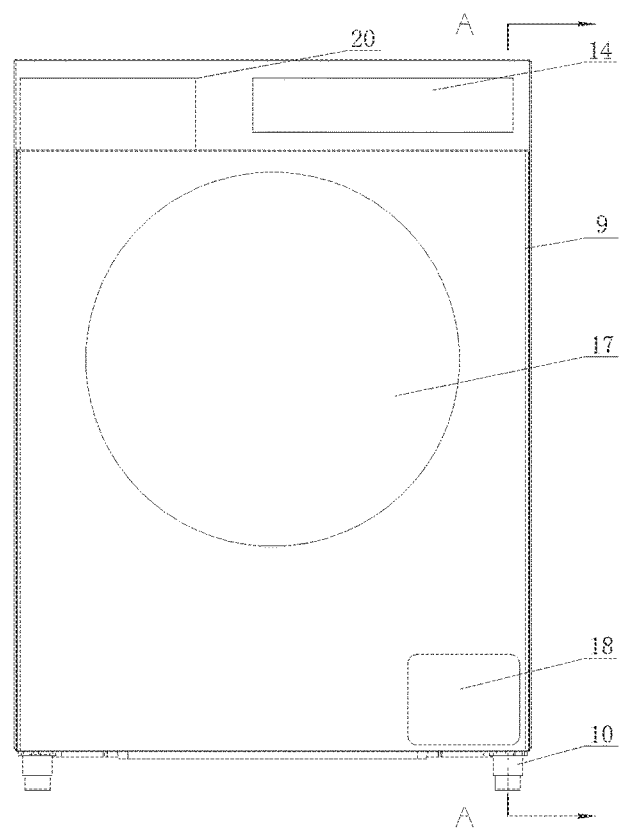
FIG. 2 is an installation schematic diagram of leveling bottom feet according to an embodiment of the present disclosure.
Figure 3:
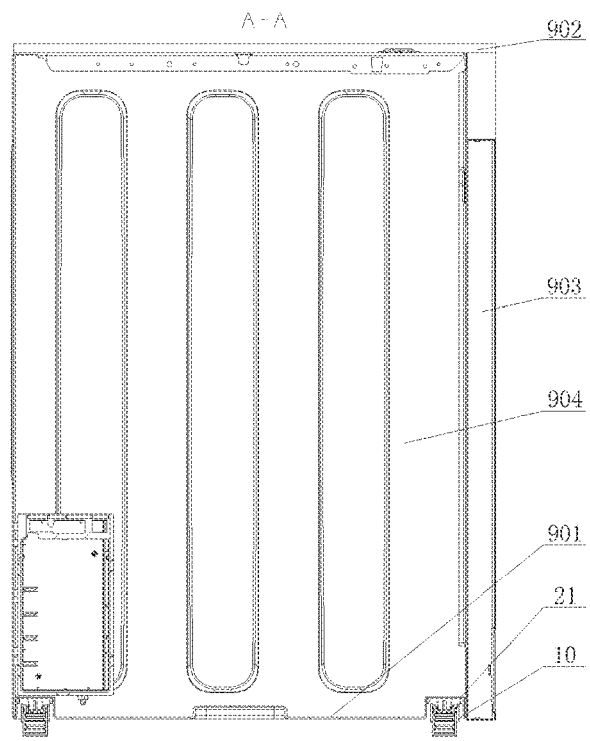
FIG. 3 is a sectional view of a washing machine according to an embodiment of the present disclosure taken along section A-A in FIG. 2.
Figure 4:
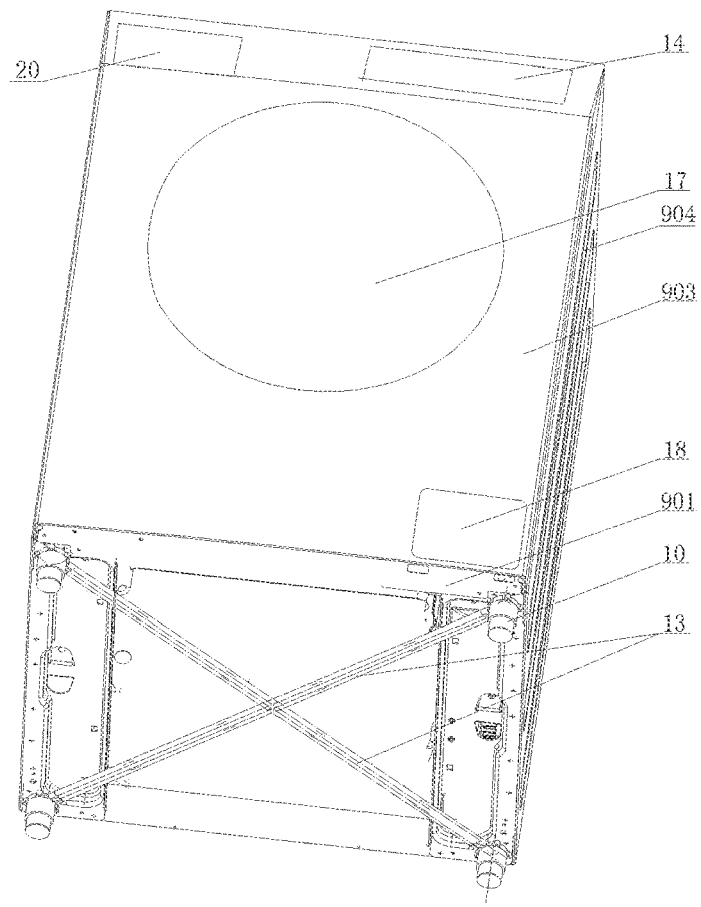
FIG. 4 is an installation schematic diagram of a bottom of a washing machine according to an embodiment of the present disclosure.
Figure 5:
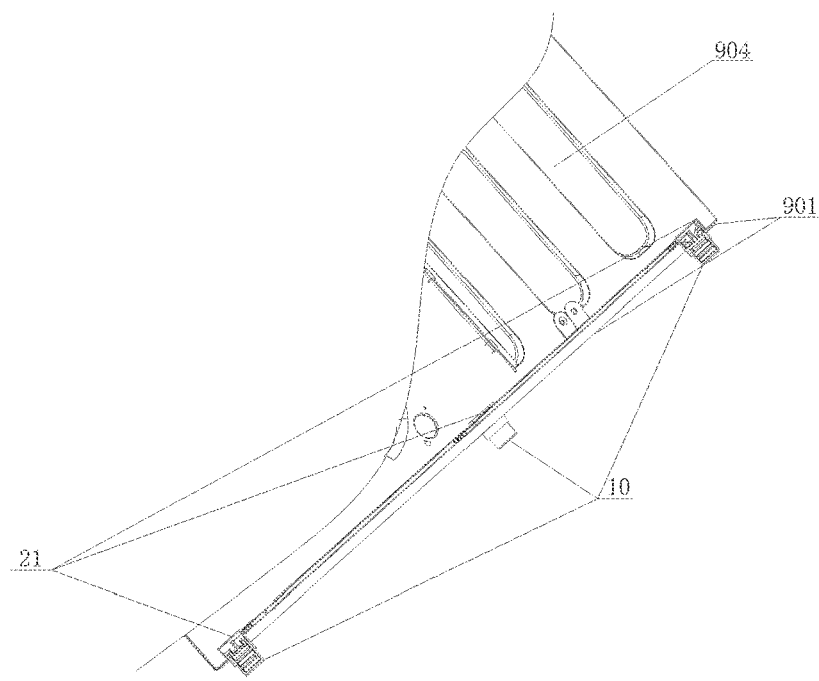
FIG. 5 is an installation schematic diagram of a part of a bottom of a washing machine according to an embodiment of the present disclosure.

As show in FIG. 2, the present disclosure is illustrated by taking a drum washing machine as an example. The drum washing machine includes: a shell 9 for keeping an entire frame and an exterior of the washing machine, comprising an upper plate 902, a front plate 903, a side plate 904 and a bottom plate 901, a detergent box 20 for storing washing powder, wash solution or softener, a control panel 14 for operating the washing machine, a door 17 for opening to remove or put in clothes, and the bottom plate 901 which is equipped with leveling bottom feet for automatically adjusting height of the washing machine, and a cover plate 18 is provided under the front plate 903.

Embodiment 1

As shown in FIG. 2, an automatic leveling washing machine comprises a shell 9 and a barrel assembly set in the shell 9 to wash clothes. A bottom plate 901 of the shell 9 is provided with leveling bottom feet 10. Hydraulic medium is provided inside the leveling bottom foot 10, and hydraulic medium flows inside the leveling bottom foot 10 or between leveling bottom feet 10 to realize automatic leveling of the washing machine. The bottom plate 901 of the shell is provided with mounting grooves for fixing and mounting leveling bottom feet 10.

For the automatic leveling washing machine in the embodiment, hydraulic medium and some gas flows inside each leveling bottom foot or between leveling bottom feet. And then the amount of compression of the leveling bottom foot which is under bigger pressure is big, and the leveling bottom foot stretches under smaller pressure thereby automatically realizing the leveling of the height.

For the automatic leveling washing machine in the embodiment, hydraulic pressure system can also self-level on the partial load during a washing process and a dewatering process of a washing machine, thereby realizing lower vibration and less noise.

For the automatic leveling washing machine in the embodiment, the mounting groove effectively and quickly positions the leveling bottom feet. A circumferential surface of the mounting groove protects the leveling bottom feet and allows high reliability of operation even that a jacket of the leveling bottom foot is made of plastic.

Further, as show in FIGS. 2 to 6, the leveling bottom foot comprises a fixed part and a movable part, and a hollow cavity is formed between the fixed part and the movable part. The hollow cavity is provided with a hydraulic medium. Under the action of pressure, the hydraulic medium flows in the hollow cavity inside the leveling bottom foot and/or the hollow cavities between leveling bottom feet to realize the expansion and contraction of the movable part, to execute automatic leveling. The mounting groove comprises a stamping groove 21 which is stamped and formed on the bottom plate 901. The stamping groove 21 matches with the fixed part of the leveling bottom foot, and the fixed part of the leveling bottom foot is fixed in the stamping groove 21.

Figure 7:
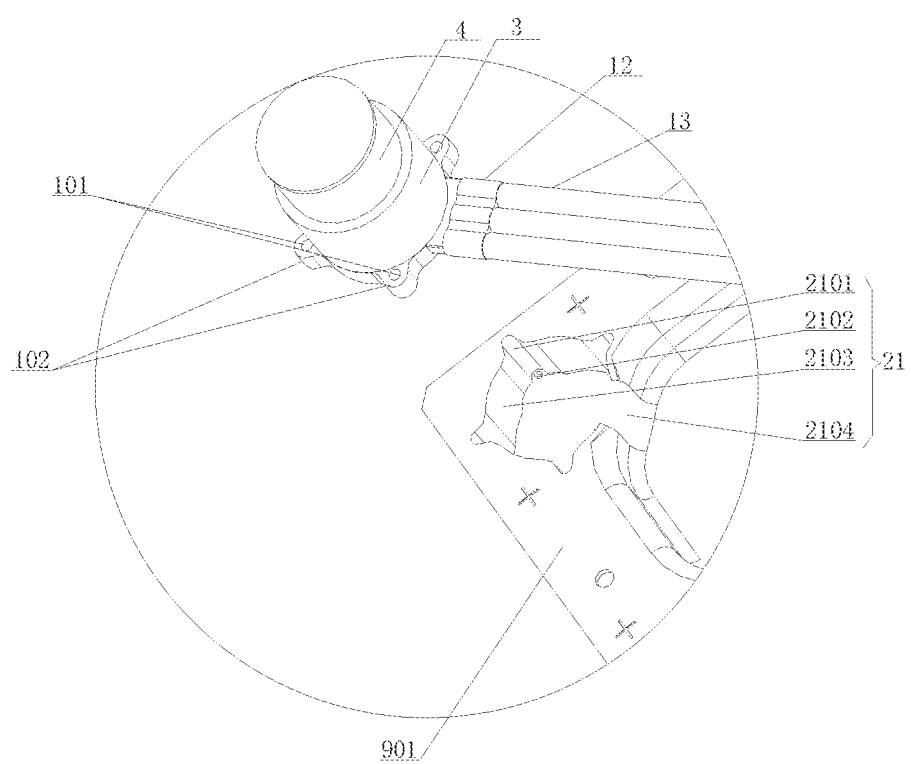
FIG. 7 is an enlarged partial view of part C in FIG. 6.

Specifically, as shown in FIG. 7, the fixed part comprises a foot base, and the movable part comprises a flexible housing 6 and an adjustable foot 4. The adjustable foot 4 is slidably sleeved in the foot base, and a mounting chamber is formed by the adjustable foot 4 and the foot base. The flexible housing 6 is set in the mounting chamber. A hollow cavity is provided inside the flexible housing 6 and is provided with a hydraulic medium therein. One end of the foot base is fixed in the stamping groove 21. The adjustable foot 4 stretches out from the stamping groove 21 when it is not under pressure.

Figure 8:
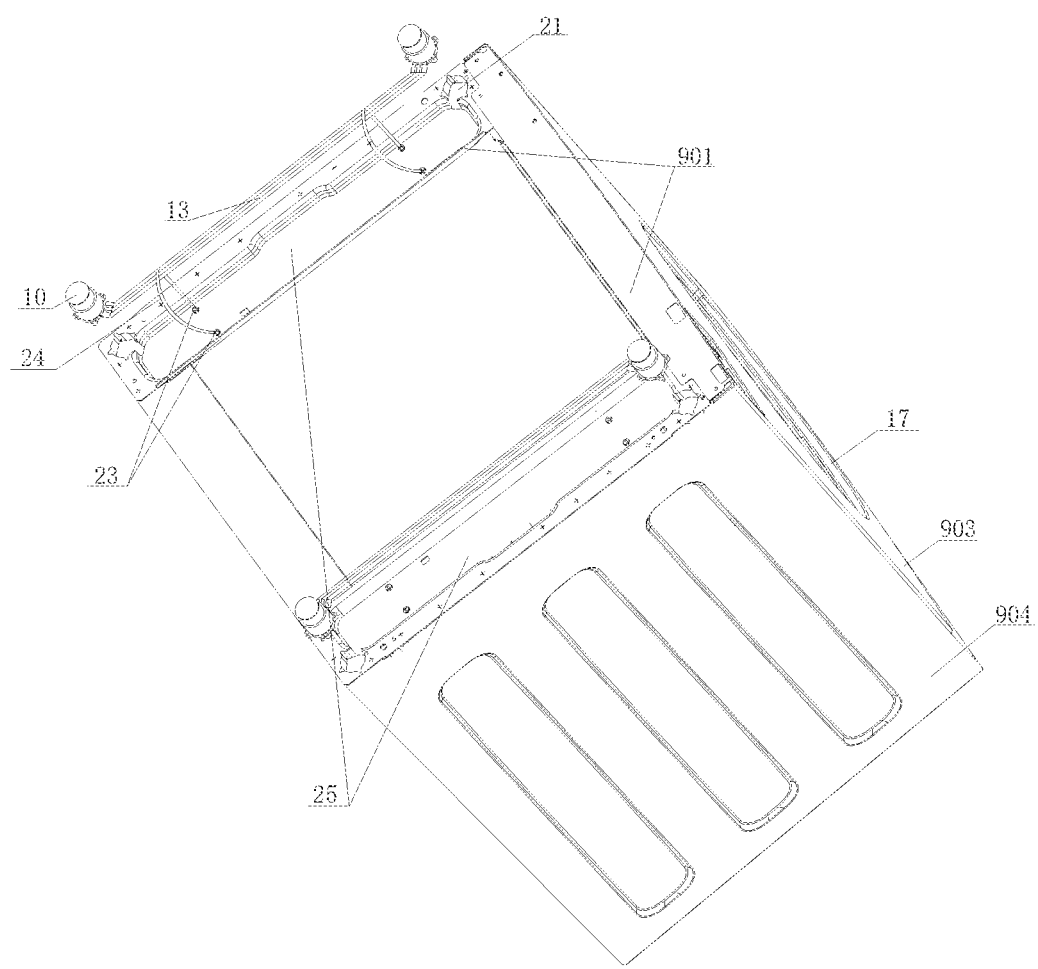
FIG. 8 is an exploded view of leveling bottom feet being installed to a washing machine according to another embodiment of the present disclosure.
Figure 9:
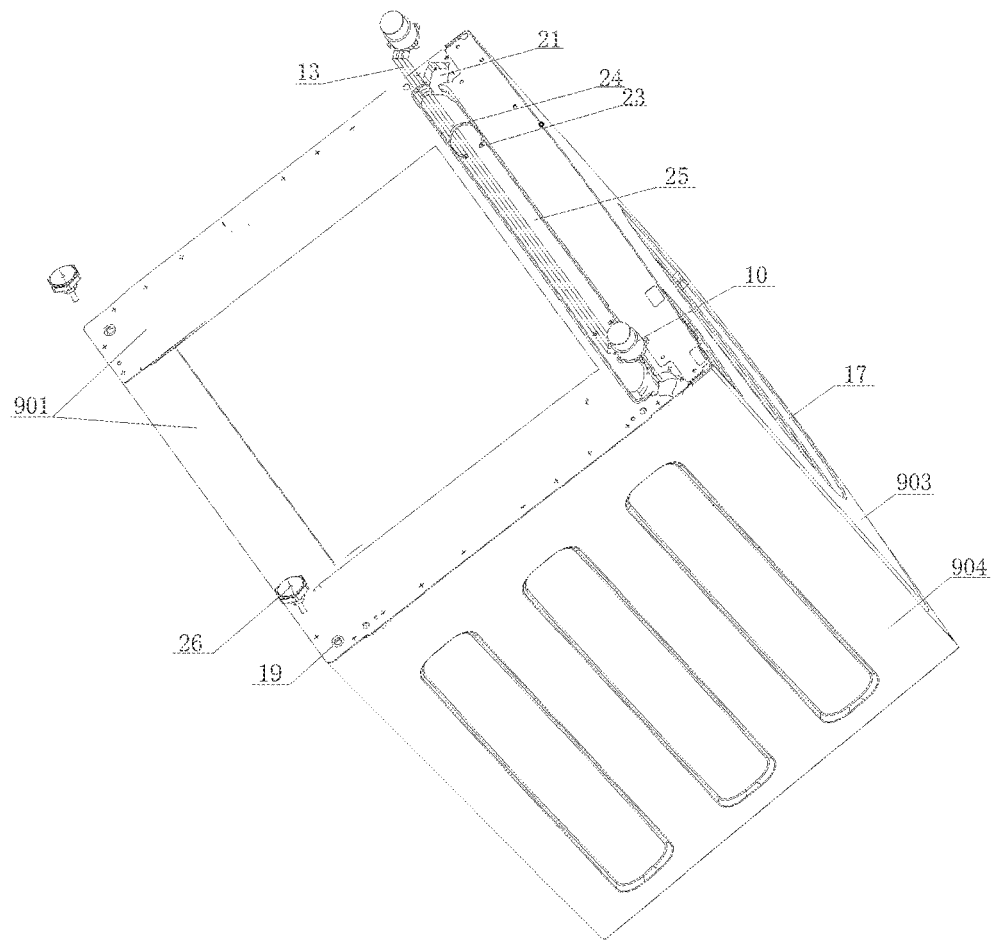
FIG. 9 is an exploded view of leveling bottom feet being installed to a washing machine according to another embodiment of the present disclosure.
Figure 10:
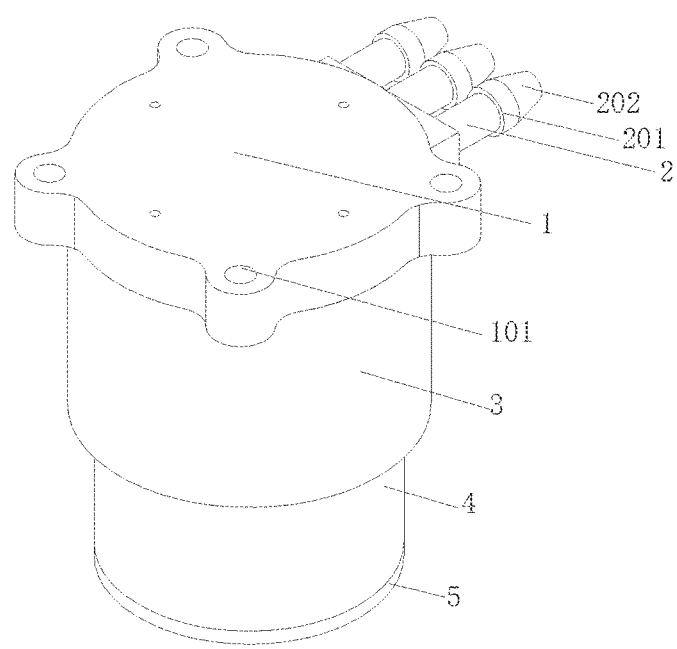
FIG. 10 is a schematic diagram of stereoscopic structure of a leveling bottom foot according to an embodiment of the present disclosure.
Figure 11:
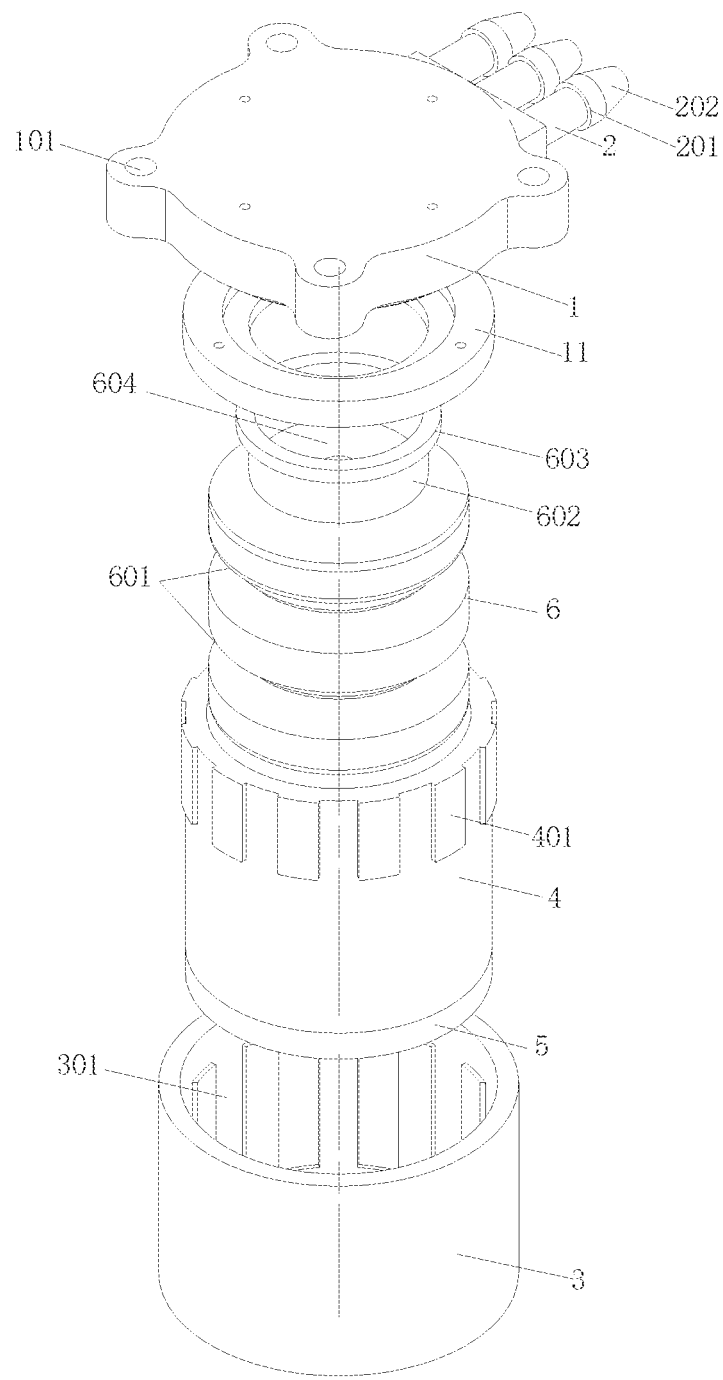
FIG. 11 is an exploded view of structure of a leveling bottom foot according to an embodiment of the present disclosure.
Figure 12:
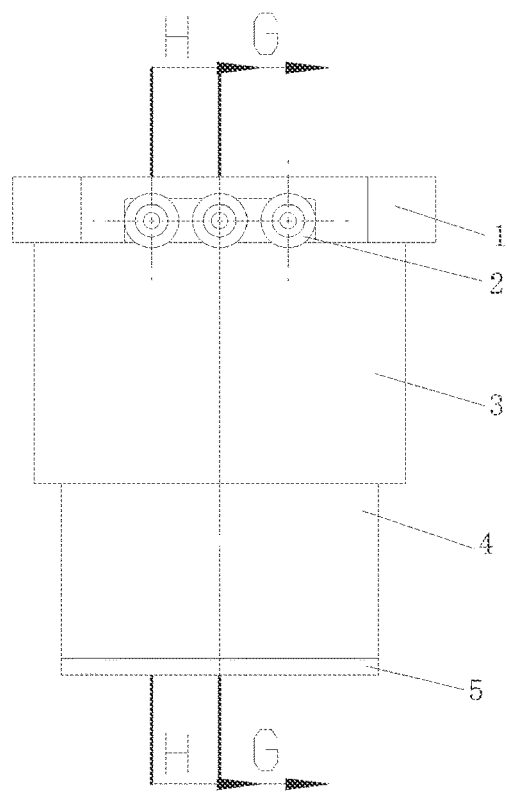
FIG. 12 is a front view of a leveling bottom foot according to an embodiment of the present disclosure.
Figure 13:
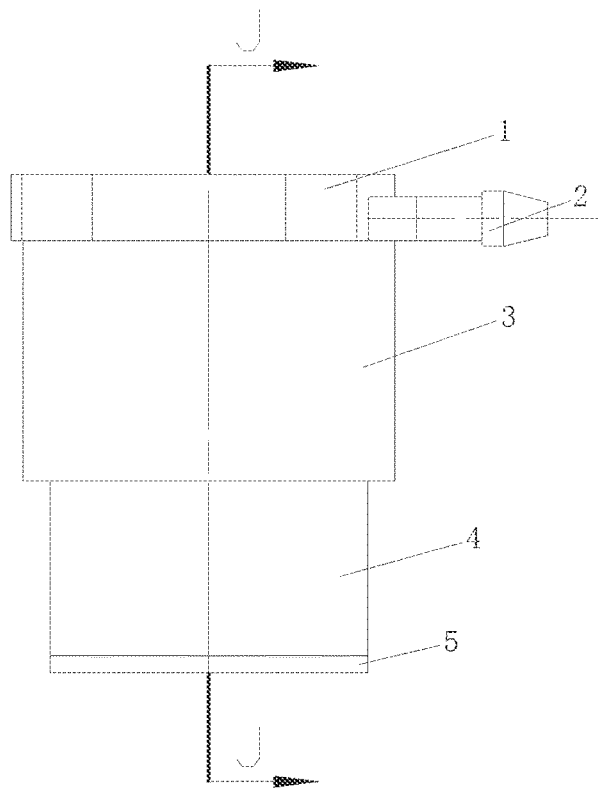
FIG. 13 is a side view of a leveling bottom foot according to an embodiment of the present disclosure.
Figure 14:
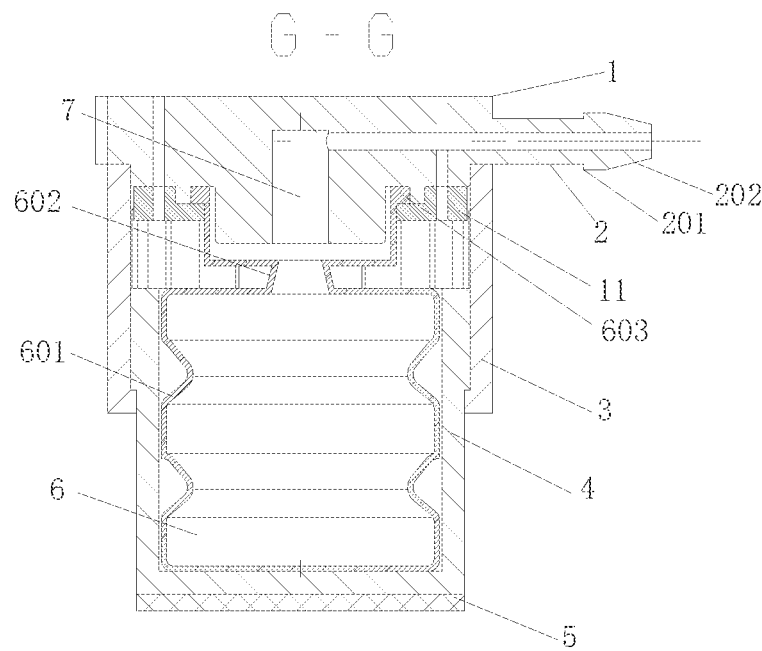
FIG. 14 is a sectional view of a leveling bottom foot of a washing machine according to an embodiment of the present disclosure taken along section G-G in FIG. 12.
Figure 15:
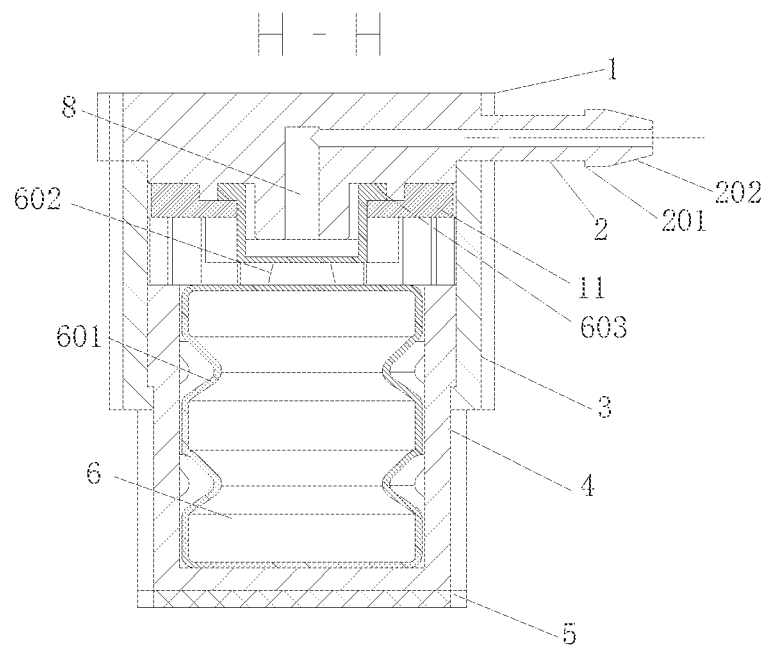
FIG. 15 is a sectional view of a leveling bottom foot of a washing machine according to an embodiment of the present disclosure taken along section H-H in FIG. 12.
Figure 16:
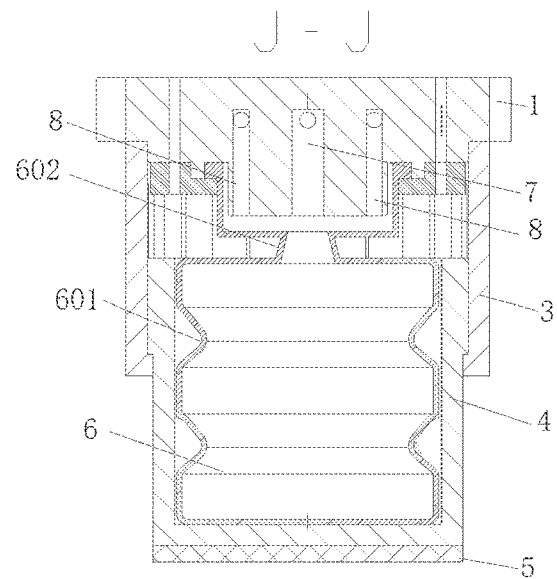
FIG. 16 is a sectional view of a leveling bottom foot of a washing machine according to an embodiment of the present disclosure taken along section J-J in FIG. 13.
Figure 17:
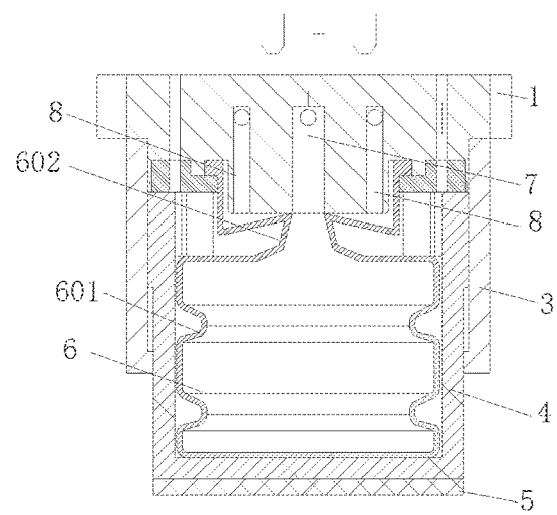
FIG. 17 is a sectional view of a leveling bottom foot of a washing machine after being completely compressed according to an embodiment of the present disclosure taken along section J-J in FIG. 5.

Even further, as shown in FIGS. 8 and 9, the foot base is respectively provided with an orifice and a valve opening which are communicated with the hollow cavity. The orifice and the valve opening are respectively connected with a high-pressure oil pipe group 13, and the high-pressure oil pipe group 13 is communicated with the hollow cavity, thereby hydraulic medium flows between the leveling bottom feet. The mounting groove further comprises an oil pipe groove 25 which is stamped and formed on the bottom plate 901 for accommodating the high-pressure oil pipe group.

As shown in FIG. 7, the foot base comprises a seat 1 and a jacket 3. The adjustable foot is slidably sleeved at one end of the jacket 3. The seat 1 is set at the other end of the jacket 3 and encloses the jacket 3.

The seat 1 is provided with a number of fixing columns 102, and the fixing column 102 is provided with mounting holes 101.

The stamping groove 21 includes a fixing column groove 2101 which matches with the fixing column and a jacket groove 2103 which matches with the jacket. A second mounting hole 2102 corresponding to the mounting hole 101 is provided in the fixing column groove 2101.

Further, the bottom plate 901 is a quadrangular plate, and leveling bottom feet 10 are respectively mounted on four corners of the bottom plate 901. The stamping grooves 21 are set on four corners of the bottom plate 901 corresponding to the leveling bottom feet 10.

The four leveling bottom feet 10 are respectively connected to a same communicating device through the high-pressure oil pipe group 13 to enable the hydraulic medium to flow among the four leveling bottom feet 10.

The stamping grooves 21 on the four corners of the bottom plate 901 are respectively provided with chips 2104 for allowing the high-pressure oil pipe group 13 to pass through.

Each of the four corners of the bottom plate 901 in the embodiment is respectively provided with a stamping groove 21 for positioning, fixing, protecting and reinforcing the leveling bottom foot 10, which greatly improves the life of the leveling bottom foot 10.

The high-pressure oil pipe group 13 is connected to four leveling bottom feet 10 in an X-shape. The bottom plate 901 is punched or placed with an X-shape or an X-shaped oil pipe groove 25.

A fixing hole 23 is arranged in the oil pipe groove 25. The high-pressure oil pipe group 13 can be firmly fixed to the bottom plate 901 by a tie 24, and preferably it is fastened in the oil pipe groove 25. On one hand, this avoids leakage of oil pipes and is more beautiful. On another hand, it avoids unnecessary external damage to the oil pipes. For example, if the oil pipe is not fixed, it may be loosen and collide with the bottom plate to make noise in transport or use. Or the bottom plate 901 gets worn and leads to oil leakage, and more serious is that the oil pipes are pulled by other items to get broken and cause oil leakage.

Figure 6:
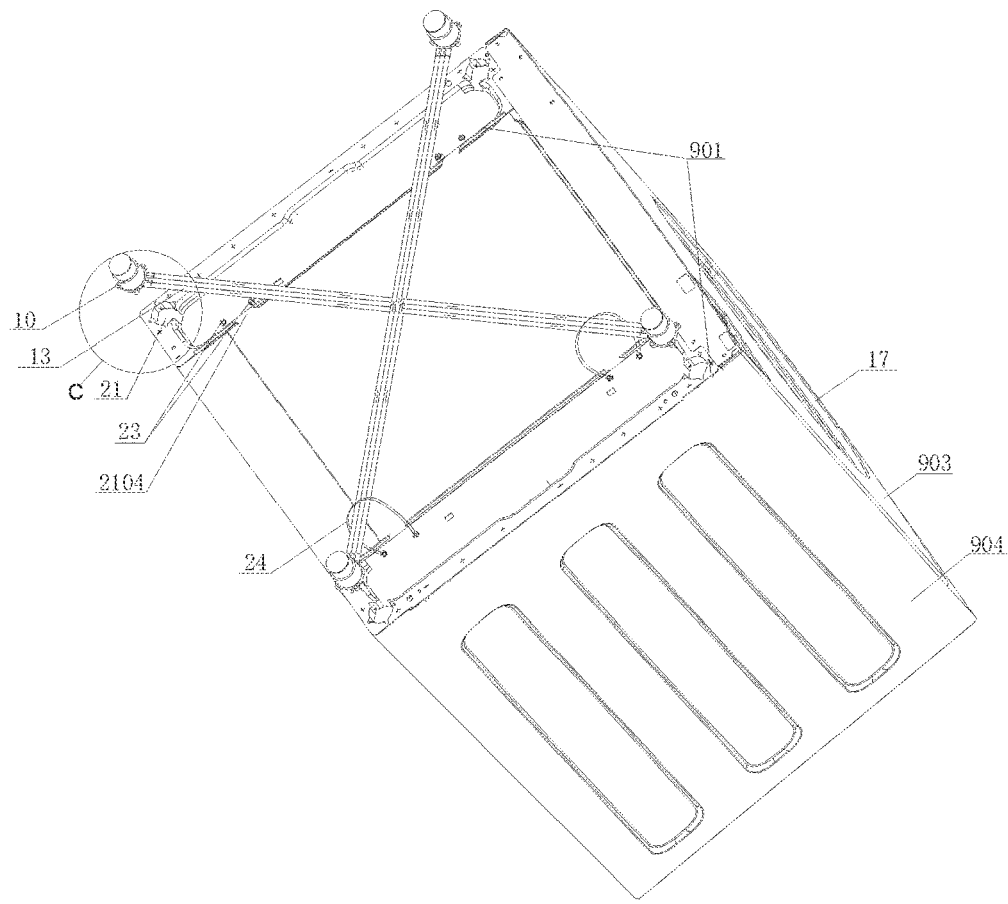
FIG. 6 is an exploded view of leveling bottom feet being installed to a washing machine according to an embodiment of the present disclosure.

As shown in FIG. 7, which is an enlarged partial view of part C in FIG. 6 of the automatic leveling washing machine, it is more intuitively to see the cooperation relationship between the leveling bottom foot 10 and the stamping groove 21.

The leveling bottom foot 10 and the high-pressure oil pipe group 13 are fastened together by clamps.

The leveling bottom foot 10 has a jacket that protects the moveable leveling bottom foot 10.

The leveling bottom foot 10 has a plurality of fixing columns 102 that each has a mounting hole 101 thereon.

The bottom plate 901 is provided with a stamping groove 21 which is substantially in the same shape as the upper portion of the leveling bottom foot 10, and stamping groove 21 includes:

A plurality of fixing column grooves 2101, which has a second mounting hole 2102 at the bottom and can be fastened by screws or bolts to the fixing columns of the leveling bottom feet, a jacket groove 2103, which is in a mating relationship with the jacket of the leveling bottom foot 10, playing the role of positioning, fixing, protection and reinforcement of the leveling bottom foot 10, and greatly increasing the life of the leveling bottom foot 10, and a chip 2104, which prevents interference with the high-pressure oil pipe group 13 connected to the upper portion of the leveling bottom foot 10.

The side plate 904 is profiled to increase the strength of the body of the washing machine, which can effectively prevent the washing machine from being deformed due to heavy internal weight of the washing machine under full load.

As a way of the present embodiment, as shown in FIG. 8 and FIG. 9, the bottom plate 901 is a quadrangular plate, the leveling feet bottom 10 are respectively mounted on the four corners of the bottom plate 901. And the stamping grooves 21 are provided on the four corners of the bottom plate 901 corresponding to the leveling bottom foot 10.

The leveling bottom feet 10 at two ends of one edge of the bottom plate 901 are respectively communicated with that of an opposite edge by the high-pressure oil pipe group 13. The oil pipe grooves 25 are provided on two opposite edges of the bottom plate 901 corresponding to high-pressure oil pipe group 13.

Further, the two stamping grooves 21 for fixing the two leveling bottom feet 10 which are communicated with each other are in communication with the oil pipe grooves 25 for accommodating the high-pressure oil pipe group 13 which connects the two leveling bottom feet 10.

Even further, a fixing assembly for fixing the high-pressure oil pipe group 13 is provided in the oil pipe groove 25.

Specifically, the fixing assembly includes fixing holes 23 disposed on two sides of the oil pipe groove 25 and a tie 24 whose two ends are respectively fixed in fixing holes on the two sides.

As shown in FIG. 8, the bottom plate 901 of the washing machine is provided with two sets of leveling bottom feet 10 communicating with each other. Along A direction, i.e., the two leveling bottom feet 10 of two side plates 904 on the left and right of the washing machine are communicated, and the bottom plate 901 of the washing machine is provided as:

Along the A direction, an oil pipe groove 25 is provided between every two leveling bottom feet 10. As described above, the fixing hole 23 is provided, and the tie 24 fastens the high-pressure oil pipe group 13.

In the same embodiment, along B direction, i.e., two leveling bottom feet 10 on two sides of a front plate or a back plate of the washing machine are communicated, and the bottom plate 901 of the washing machine is arranged as shown in the figure.

As shown in FIG. 9, the bottom plate 901 of the washing machine is provided with a set of two communicated leveling bottom feet. In the same embodiment, along B direction, i.e., the two leveling bottom feet on the front and back sides of the washing machine are communicated. The other side is provided with normal bolting feet. There are two specific embodiments. Taking the embodiment that two leveling bottom feet along B direction are communicated and both the two leveling bottom feet are close to the front plate 903 as an example, the bottom plate of the washing machine is arranged as shown in the figure:

In the B direction, an oil pipe groove 25 is provided between the two bottom feet close to the front plate 903. Same as above, the fixing hole 23 is provided, and the tie 24 fastens the high-pressure oil pipe group 13. In the B direction, the two bottom feet apart from the front plate 903 are existing bolting feet.

In the same embodiment, along A direction, i.e., two leveling bottom feet 10 on one side of a left plate or a right plate of the washing machine are communicated, and normal bolting feet are provided on the other side. There are two specific embodiments, and the bottom plate 901 of the washing machine is arranged as shown in the figure.

Embodiment 2

As shown in FIG. 10 to 16, a leveling bottom foot in the embodiment comprises a foot base, a flexible housing 6 and an adjustable foot 4. The foot base is provided with a hollow cavity, and is respectively provided with an orifice 7 and a valve opening 8 which are respectively connected with high-pressure oil pipes. The flexible housing 6 is provided inside the hollow cavity and has an accommodating chamber therein. The accommodating chamber is provided with hydraulic medium therein, and the hydraulic medium inside numbers of bottom feet can flow among the bottom feet under pressure through high-pressure oil pipes. One end of the adjustable foot 4 is relatively slidably set in the hollow cavity and the flexible housing 6 is in contact with or connected to the adjustable foot 4.

The leveling bottom foot of the present disclosure works according to the hydraulic principle and is provided with a hydraulic medium therein. Under different pressures, the bottom foot is made to automatically adjust adaptively due to the fluidity of the hydraulic medium.

As the orifice 7 and the valve opening 8 of the leveling bottom foot in the embodiment are respectively connected with high-pressure oil pipes and the leveling bottom feet are communicated by high-pressure oil pipes, so the adjusting range of the bottom feet is wider and achieves better results.

As the leveling bottom foot of the present disclosure holds the hydraulic medium in the enclosed flexible housing 6 and the flexible housing 6 is set inside the adjustable foot 4. It effectively solves the problem of the leakage of the hydraulic medium and ensures the working stability of the bottom foot.

Therefore, the structure of the leveling bottom foot of the present embodiment is simple, and the cost is low. It is easy to use and has high reliability. It can remarkably reduce the vibration and noise, and improve the comfort of the experience of the washing machine for users.

Further, the foot base in the embodiment comprises a seat 1 and a jacket 3 which are connected with each other. The seat 1 is provided with a groove, and a press ring 11 is provided between the seat 1 and the jacket 3. One end of the flexible housing 6 has an opening 604 where a sealing structure 603 is provided. One end of the sealing structure 603 is set in the groove and the other end keeps the sealed connection between the flexible housing 6 and the seat 1 under the press fit of the press ring 11.

Further, one orifice 7 and at least two valve openings 8 are provided in the seat 1 of the embodiment. The orifice 7 and valve openings 8 are respectively connected to the opening 604 of the flexible housing 6 and the orifice 7 is set between the valve openings 8. Under the first pressure, the orifice 7 and valve openings 8 are communicated. Under the second pressure, the flexible housing 6 is compressed till valve openings 8 are blocked up and the orifice 7 stays communicated.

The seat 1 is provided with numbers of oil nipples 2 which are respectively communicated with the orifice 7 and valve openings 8. The oil nipple 2 has an anti-stripping boss 201. The external diameter of the anti-stripping boss 201 is bigger than the internal diameter of the high-pressure oil pipe, and specifically is from 0.1 mm to 1.5 mm.

The starting end of the oil nipple 2 has a guide mechanism 202, and specifically the guide mechanism 202 is a chamfer structure, making the starting end of the oil nipple easy to insert into the oil pipes.

Specifically, as show in figures, the leveling bottom foot in the embodiment comprises an orifice 7 and two valve openings 8 and the orifice 7 is set between the two valve openings 8. The orifice 7 is connected to a second oil nipple 204 and two valve openings 8 are respectively connected to a first oil nipple 203 and a third oil nipple 205.

The seat 1 is provided with numbers of mounting holes 101 and can be secured to the bottom plate 901 by bolts or screws. It is easy to associate with this that the central location of the seat 1 has a screw column, screwing into the bottom plate 901 of the washing machine.

A fine diameter structure 602 is provided between the opening 604 of the flexible housing 6 and the hollow cavity according to feet of the washing machine in the embodiment and the internal diameter of the fine diameter structure 602 is smaller than the internal diameter of the opening 604 and the internal diameter of the hollow cavity.

The central section of the fine diameter structure 602 of the flexible housing 6 in the embodiment is provided with an oil hole. The characteristic of the fine diameter structure 602 is that the oil from the oil hole can keep flowing into or flowing out from the hydraulic medium of the orifice 7 and the valve opening 8. Once the pressure of the adjustable foot 4 is too large, the peripheral rubber of the fine diameter structure 602 fits the seat 1, sealing the valve opening 8, achieving greater throttling effect.

The flexible housing 6 in the embodiment has a bellows section and the interior of the bellows section is the hollow cavity. The bellows section makes the flexible housing 6 while compressing or elongating to form unnecessary press-pleating, to extend service life.

According to the leveling bottom feet in the embodiment, the inwall of the jacket 3 is provided with a vertical limiting groove 301, the outer wall of the adjustable foot 4 is provided with a vertical limiting bulge 401, and the vertical limiting groove 301 cooperates with the vertical limiting bulge 401 to limit the vertically up and down telescopic movement of the adjustable foot. This setting has the following advantages:

(1) making the adjustable foot 4 move up and down vertically, with no occurrence of side deviation;

(2) preventing the rotation of the adjustable foot 4 in the jacket 3, greatly reducing the vibration of the washing machine;

(3) effectively preventing the adjustable foot 4 from falling off the jacket 3, avoiding the flexible housing 6 from bursting or directly contacting the ground due to sharp objects.

As shown in FIG. 18 to 22, a leveling bottom foot is provided in the embodiment. The bottom of the washing machine is provided with numbers of bottom feet 10 and the bottom foot 10 comprises a fixed part and a movable part, and a hollow cavity is formed between the fixed part and the movable part. The hollow cavity is provided with a hydraulic medium. Every two bottom feet 10 are connected by a high-pressure oil pipe to communicate hollow cavitys of the two bottom feet 10. Or, the bottom feet 10 are separately connected to a communicating device 15 by high-pressure oil pipes, to communicate hollow cavitys of all bottom feet. Under the action of pressure, the hydraulic medium can flow between hollow cavities of all connected bottom feet 10 to realize the expansion and contraction of the movable part, to execute automatic leveling.

In the present embodiment, when the bottom foot is under a certain pressure, the hydraulic medium compresses gas, and the movable part expands and contracts adaptively. When the pressure increases further, the gas is no longer compressed, the internal pressure of the gas reacts to the hydraulic medium and the movable part is with sufficient support force therewith. Therefore, the bottom foot of the embodiment has an adaptive automatic leveling function. The hydraulic medium of the embodiment is specifically hydraulic oil.

The leveling bottom foot of the present embodiment, according to the hydraulic principle, is provided with a hydraulic medium therein. Under different pressures, the bottom foot is made to automatically adjust adaptively due to the fluidity of the hydraulic medium. The hydraulic medium can flow among all the bottom feet. When one of the bottom feet is subjected to compression, the hydraulic medium flows to another bottom foot communicated with it. The amount of the hydraulic medium in another bottom foot increases, and the pressure increases to make the bottom foot stretch out so as to ensure sufficient support force. The adjusting range of the bottom feet is wider and can achieve better results.

Therefore, the structure of the leveling bottom foot of the present embodiment is simple, and the cost is low. It is easy to use and has high reliability, and it can remarkably reduce the vibration, reduce noise, and improve the comfort of the experience of the washing machine for users.

A drum washing machine is taken as an example in the present disclosure. The drum washing machine comprises:

A washing drum for holding and washing clothes; a detergent box for storing washing powder, wash solution or softener and so on; a control panel 14 for operating the washing machine. A window for opening to remove or put in clothes, a motor assembly which connects at least one rotatable drive shaft to achieve at least one output, a shell 9 for keeping an entire frame and an exterior of the washing machine, and a bottom plate 901 under which the leveling bottom feet of the embodiment are provided.

Figure 18:
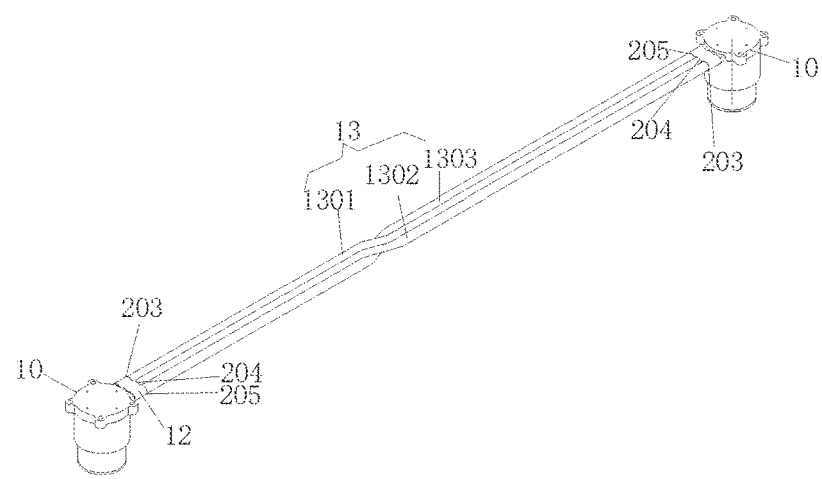
FIG. 18 is a combined installation schematic diagram of a leveling bottom foot of a washing machine according to an embodiment of the present disclosure.

As shown in FIG. 18, the leveling bottom feet in the embodiment comprises a first bottom foot and a second bottom foot, the first bottom foot and the second bottom foot are respectively provided with orifice 7 and valve opening 8 which are respectively communicated with the hollow cavity. The orifice 7 of the first bottom foot is connected to the valve opening 8 of the second bottom foot by the high-pressure oil pipe, and the valve opening 8 of the first bottom foot is connected to the orifice 7 of the second bottom foot by the high-pressure oil pipe.

Specifically, the first bottom foot and the second bottom foot are respectively provided with one orifice 7 and two valve openings 5 which are a first valve opening and a second valve opening. The orifice 7, the first valve opening and the second valve opening are respectively communicated with the hollow cavity. The orifice 7 of the first bottom foot is connected with the first valve opening of the second bottom foot by a second high-pressure oil pipe 1302, the first valve opening of the first bottom foot is connected with the orifice 7 of the second bottom foot by a first high-pressure oil pipe 1301 and the second valve opening of the first bottom foot is connected with the second valve opening of the second bottom foot by a third high-pressure oil pipe 1303. The first high-pressure oil pipe 1301, the second high-pressure oil pipe 1302 and the third high-pressure oil pipe 1303 mentioned constitute a high-pressure oil pipe group 13.

Figure 19:
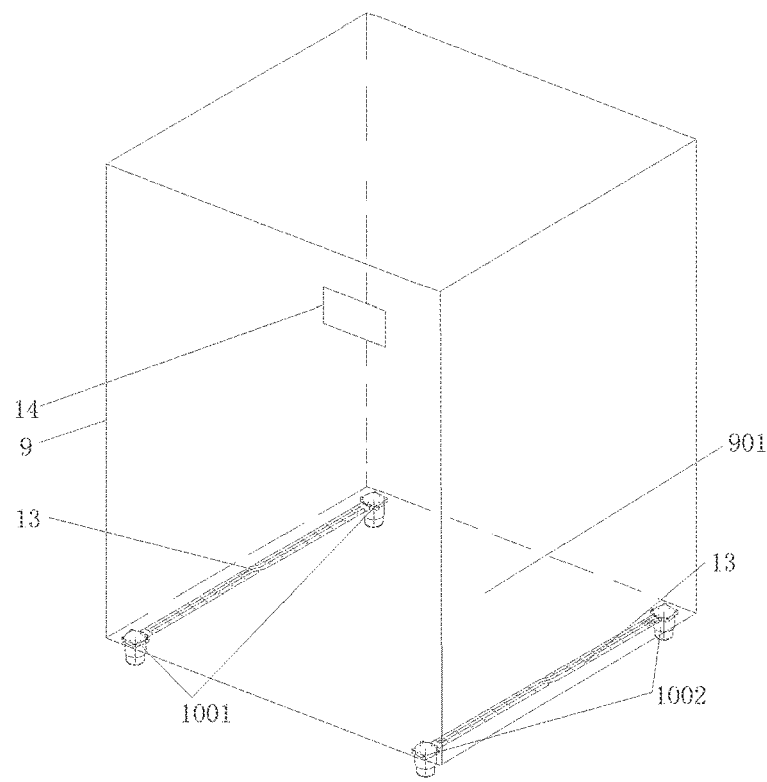
FIG. 19 is an installation schematic diagram of a leveling bottom foot of a washing machine according to an embodiment of the present disclosure being fixed to a washing machine.

Specifically, as shown in FIG. 19, four bottom feet are fixed to four corners of the bottom plate 901 of the washing machine. The high-pressure oil pipe group 13 communicates the two bottom feet on the left side of the bottom plate 901 of the washing machine, constituting a first bottom foot group 1001. The high-pressure oil pipe group 13 communicates the two bottom feet on the right side of the bottom plate 901 of the washing machine, constituting a second bottom foot group 1002.

In this way, it enables the hydraulic medium and part of the gas of the first bottom foot group 1001 under different pressures to flow mutually between two bottom feet. And it enables hydraulic medium and part of the gas of the second bottom foot group 1002 under different pressures to flow mutually between the two bottom feet.

Figure 20:
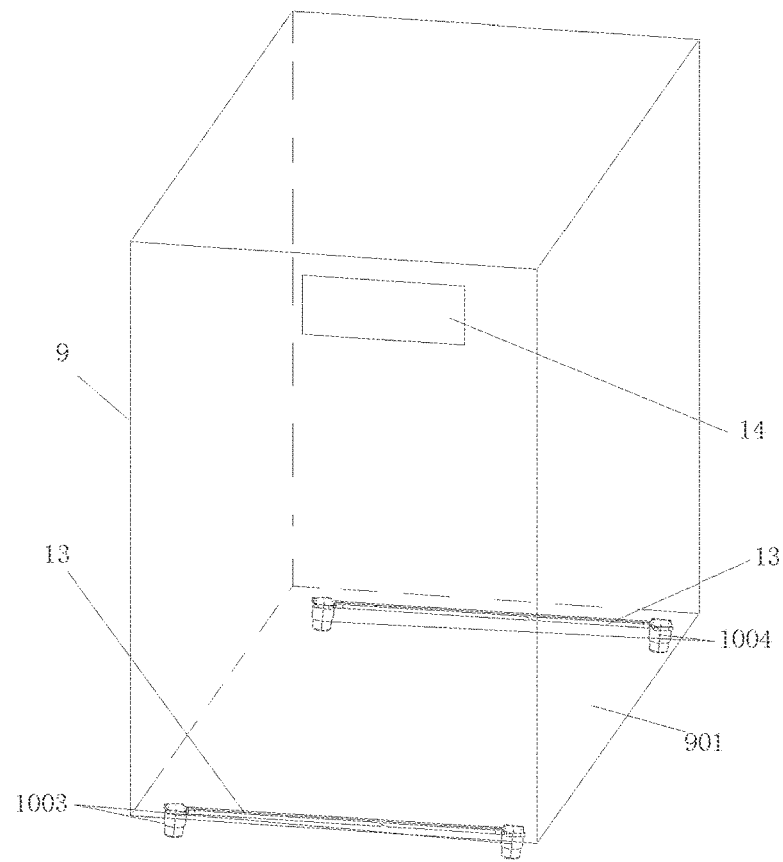
FIG. 20 is an installation schematic diagram of a leveling bottom foot of a washing machine according to another embodiment of the present disclosure being fixed to a washing machine.

As shown in FIG. 20, four bottom feet are fixed to four corners of the bottom plate 901 of the washing machine. The high-pressure oil pipe group 13 communicates the two bottom feet on the rear side of the bottom plate 901 of the washing machine, constituting a third bottom foot group 1003. The high-pressure oil pipe group 13 communicates the two feet in the front side of the bottom plate 901 of the washing machine, constituting a fourth bottom foot group 1004.

In this way, it enables the hydraulic medium and part of the gas of the third bottom foot group 1003 under different pressures to flow mutually between two bottom feet. And it enables hydraulic medium and part of the gas of the fourth foot group 1004 under different pressures to flow mutually between two feet.

Figure 21:
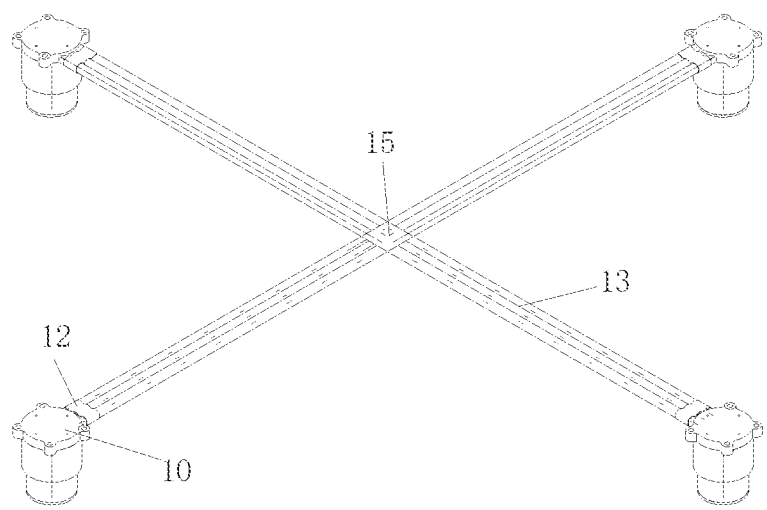
FIG. 21 is a combined installation schematic diagram of a leveling bottom foot of a washing machine according to another embodiment of the present disclosure.
Figure 22:
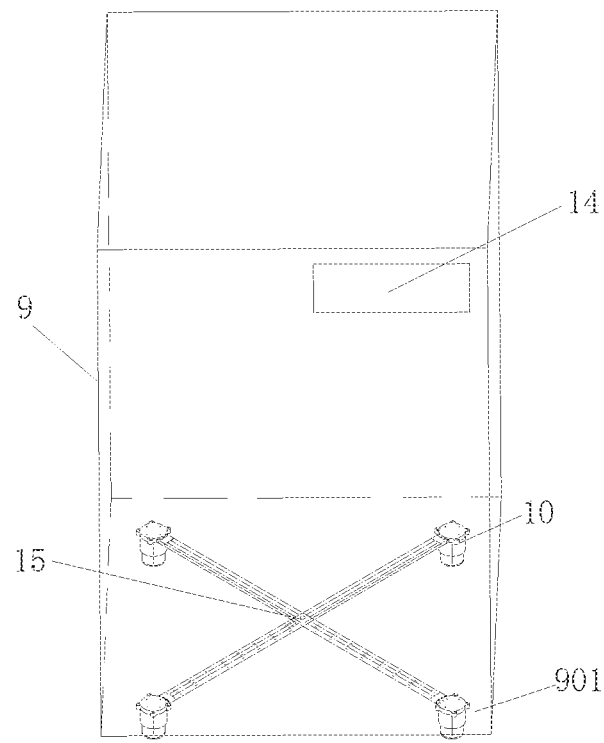
FIG. 22 is an installation schematic diagram of a leveling bottom foot of a washing machine according to another embodiment of the present disclosure being fixed to a washing machine.

As shown in FIGS. 21 and 22, at least four bottom feet 10 are provided evenly at four corners of the bottom plate 901 of the shell 9 or along the circumferential direction of the bottom plate 901 of the shell 9 in the embodiment. Each bottom foot 10 is provided with hydraulic medium and gas. In a first range of pressure, the hydraulic medium and the gas inside the each bottom foot 10 interact with each other to realize the expansion and the contraction of the movable part, to level automatically. In a second range of pressure, the hydraulic medium and the gas inside the communicated feet 10 interact with each other to realize the expansion and the contraction of the movable part, to level automatically. This way realizes the communication between all the bottom feet, and the liquid medium can flow between all the bottom feet. The range of adjustment is larger, and the effect of adjustment is better.

Specifically, an enclosed chamber which is provided with hydraulic medium and gas is provided inside the bottom foot 10. The enclosed chamber is communicated with the high-pressure oil pipe group 13, and the high-pressure oil pipe group 13 of each bottom foot 10 is respectively communicated to a communicating device 15 to achieve the mutual communication among all the bottom feet 10.

The leveling bottom foot of the embodiment uses the gas as the elastic medium and the liquid medium as the force transmission medium. It not only has a good ability of cushioning, but also has a damping effect. At the same time, it can also adjust the height of the bottom foot itself according to the pressure it withstands.

Figure 23:
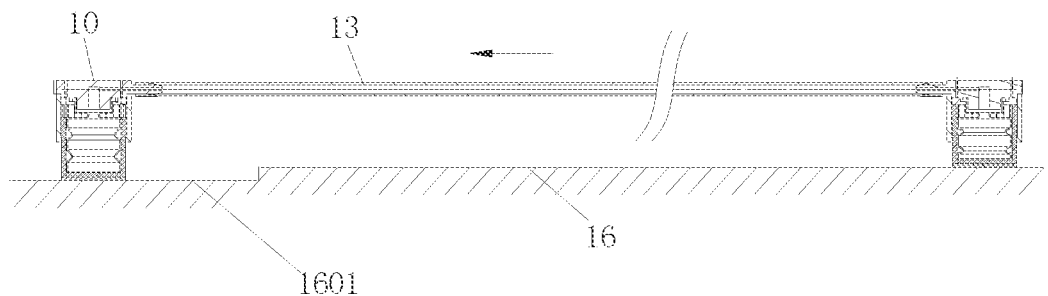
FIG. 23 is a schematic diagram of a leveling bottom foot in working state according to an embodiment of the present disclosure.

As shown in FIG. 23, the principle of leveling is specifically explained. When the washing machine is installed, it results in different levels of different bottom feet height because the ground 16 is uneven, and the position of the foot located in a ground pit 1601 is low. It is possible to know that the bottom foot in the high position bears the weight of the washing machine at first and bears great gravity. The bottom foot in the low position due to failure of supporting may bear small gravity. The adjustable foot of the bottom foot in the high position will move upward under great pressure. The height of the entire bottom foot gets small to make the volume of the hollow cavity of the flexible housing to be compressed and reduced, forcing the hydraulic medium to flow into the orifice or the valve opening and flow into the bottom foot which is in the lower position through the high-pressure oil pipe group. So that the hydraulic medium of the flexible housing 6 of the bottom foot in the lower position gets more and more and the flexible housing expands to drive the adjustable foot to extend.

When hydraulic pressures of the bottom foot in the higher position and the bottom foot in the lower position are equal, the hydraulic medium no longer flows through the high-pressure oil pipe group and the relative positions of the adjustable foot and the bottom plate of the washing machine no longer change, and the automatic adjustment of the leveling bottom feet of the washing machine is completed.

In the washing process and the dewatering process of the washing machine, because the hydraulic medium can still flow slowly to self-level, the vibration noise of the washing machine is greatly reduced.

A washing machine which has the above-mentioned leveling bottom feet is provided at the same time in the embodiment. The washing machine comprises a shell 9, and the bottom of the shell 9 is provided with a number of the leveling bottom feet 10 mentioned above. The hydraulic medium provided inside the leveling bottom feet of the washing machine can flow between the leveling bottom feet to achieve the leveling.

The factory setting of the washing machine of the embodiment is preferably that heights of four feet of the washing machine are the same. The washing machine is randomly placed on an uneven ground and the four feet bear different pressures according to the uneven states and the lengths that adjustable feet are pressed into sheaths are different, and then the automatic leveling of the washing machine is realized.

Further illustrations which are necessary for the above embodiments are:

1. Every two of the bottom feet of the embodiments of the present disclosure are communicated. It can be three or more and the number N≥2, preferably two. It costs the lowest and can achieve better results.

Four end openings of the communicating device 15 are applied to be respectively connected with four feet. It is reasonable that three, five, six or N end openings of the communicating device 15 are applied, and the end openings are respectively connected with three, five, six or N feet. The above-described embodiments apply four feet which is the most suitable merely in the situation of being capable of achieving the described functions, to control the cost to the minimum.

2. In the embodiments of the present disclosure, by taking a drum washing machine for example, the principle and the method for implementing the automatic leveling of the drum washing machine are explained, and it is easy to be associated that the present disclosure can be applied to pulsator washing machines.

3. In the embodiments of the present disclosure, by taking a washing machine for example, the principle and the method for implementing the automatic leveling of the washing machine are explained, and it is easy to be associated that the present disclosure can be applied to household appliances, such as refrigerators, freezers, dish washing machines and the like.

What described above are only preferred embodiments of the present disclosure, but are not intended to limiting the scope of the present disclosure in any forms. Although the present disclosure has been disclosed in terms of preferred embodiments, it is not limited thereto. Without departing from the scope of the technical solution of the present disclosure, any persons skilled in the present disclosure can make equivalent embodiments with various alterations and modifications as equivalent variations by utilizing the above-mentioned technical contents. However, without departing from the contents of the technical solution of the present disclosure, any simple changes, equivalent variations and modifications made according to the technical essence of the present disclosure shall all be covered within the scope of the technical solution of the present disclosure.

The invention claimed is:

1. An automatic leveling washing machine, comprising:
   a shell;
   a barrel assembly set in the shell for washing clothes, wherein a bottom plate of the shell is provided with leveling bottom feet and a mounting groove for fixing and mounting the leveling bottom feet;
   a hydraulic medium provided inside each of the leveling bottom feet and for flowing inside the leveling bottom feet and between the leveling bottom feet for automatically leveling the washing machine, and
   wherein the leveling bottom feet include a first leveling bottom foot and a second leveling bottom foot,
   the first leveling bottom foot and the second leveling bottom foot each include a fixed part including a foot base and a movable part, and a hollow cavity between the fixed part and the movable part, the hollow cavity provided with the hydraulic medium,
   the foot base is provided with an orifice and a valve opening which fluidly communicates with the hollow cavity,
   the orifice and the valve opening are respectively connected with an oil pipe which fluidly communicates with the hollow cavity of the first leveling bottom foot and the hollow cavity of the second leveling bottom foot,
   the orifice of the first leveling bottom foot connects with the valve opening of the second leveling bottom foot through the oil pipe, the valve opening of the first leveling bottom foot is connected with the orifice of the second leveling bottom foot through the oil pipe,
   both the orifice and valve opening are configured to communicate with the oil pipe under a first pressure, and
   the valve opening is configured to be blocked and the orifice is configured to maintaining communication with the oil pipe under a second pressure.

2. The automatic leveling washing machine according to claim 1, wherein
   the mounting groove comprises a plurality of stamping grooves which are stamped and formed on the bottom plate, each stamping groove matches respectively with the fixed part of the first leveling bottom foot and the fixed part of the second leveling bottom foot, and the fixed parts of the first and second leveling bottom feet are fixed in the respective stamping groove.

3. The automatic leveling washing machine according to claim 2, wherein
   the movable part comprises a flexible housing and an adjustable foot being slidably sleeved in the foot base,
   a mounting chamber is formed by the adjustable foot and the foot base,
   the flexible housing is set in the mounting chamber, the hollow cavity is provided in the flexible housing and is provided with the hydraulic medium therein,
   one end of the foot base is fixed in the stamping groove and at least part of a circumferential surface of the foot base is in close contact with an inner wall of the stamping groove.

4. The automatic leveling washing machine according to claim 3, wherein
   the mounting groove comprises an oil pipe groove being stamped and formed on the bottom plate for accommodating the oil pipe.

5. The automatic leveling washing machine according to claim 4, wherein the bottom plate is a quadrangular plate, the leveling bottom feet are respectively mounted on four corners of the bottom plate, and the plurality of stamping grooves includes four stamping grooves which are respectively set on four corners of the bottom plate corresponding to the leveling bottom feet,
   the leveling bottom feet at two ends of one edge of the bottom plate are respectively communicated with that of an opposite edge by the oil pipe, and
   the oil pipe groove is provided on two opposite edges of the bottom plate corresponding to the oil pipe.

6. The automatic leveling washing machine according to claim 5, wherein two stamping grooves of the plurality of stamping grooves are in communication with the oil pipe grooves for accommodating the oil pipe connecting the two leveling bottom feet.

7. The automatic leveling washing machine according to claim 4, wherein a fixing assembly for fixing the oil pipe is provided in the oil pipe groove.

8. The automatic leveling washing machine according to claim 7, wherein the fixing assembly includes fixing holes disposed on two sides of the oil pipe groove and a tie, and two ends of the tie are respectively fixed in fixing holes on the two sides.

9. The automatic leveling washing machine according to claim 4, further comprising:
   a third leveling bottom foot; and a fourth leveling bottom foot wherein the bottom plate is a quadrangular plate, the leveling bottom feet are respectively mounted on four corners of the bottom plate, and a respective stamping groove of the plurality of stamping grooves is set on each of four corners of the bottom plate corresponding to the leveling bottom feet, the first, second, third and fourth leveling bottom feet are respectively connected to a communicating device through the oil pipe to enable the hydraulic medium to flow between the first, second, third and fourth leveling bottom feet, and the stamping grooves on the four corners of the bottom plate are respectively provided with a chip for allowing the oil pipe to pass through.

10. The automatic leveling washing machine according to claim 3, wherein the foot base comprises a seat and a jacket, the adjustable foot is slidably sleeved at one end of the jacket, and the seat is set at the other end of the jacket and encloses the jacket, the seat is provided with a plurality of fixing columns, each fixing column is provided with a mounting hole, and each stamping groove of the plurality of stamping grooves includes a fixing column groove matching with one fixing column of the plurality of fixing columns and a jacket groove matching with the jacket, and a second mounting hole corresponding to the mounting hole is provided in the fixing column grooves.

* * * * *